United States Patent
Kurtz et al.

(10) Patent No.: US 6,848,307 B1
(45) Date of Patent: Feb. 1, 2005

(54) DUAL BEAM FREQUENCY-OUTPUT ACCELEROMETER

(75) Inventors: Anthony D. Kurtz, Ridgewood, NJ (US); Boaz Kochman, New York, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/685,145

(22) Filed: Oct. 14, 2003

(51) Int. Cl.[7] .............................................. G01P 15/08
(52) U.S. Cl. ................................................. 73/514.29
(58) Field of Search .................... 73/514.29, 862.59, 73/514, 15, 514.16, 514.36, 514.18, 514.33

(56) References Cited

U.S. PATENT DOCUMENTS

| | | | |
|---|---|---|---|
| 4,479,385 A | * 10/1984 | Koehler .................... | 73/514.29 |
| 4,628,735 A | * 12/1986 | Kirkpatrick ............... | 73/514.29 |
| 4,724,351 A | * 2/1988 | EerNisse et al. ............ | 310/328 |
| 5,020,370 A | * 6/1991 | Deval et al. .............. | 73/514.29 |
| 5,036,715 A | * 8/1991 | Hanson .................... | 73/862.59 |
| 5,089,695 A | * 2/1992 | Willson et al. ......... | 250/227.21 |
| 5,113,698 A | * 5/1992 | Grlj et al. ................ | 73/862.59 |
| 5,473,944 A |   12/1995 | Kurtz et al. .................. | 73/704 |
| 5,574,220 A | * 11/1996 | Amand et al. ........... | 73/514.29 |

\* cited by examiner

*Primary Examiner*—Helen Kwok
(74) *Attorney, Agent, or Firm*—Plevy, Howard & Darcy, P.C.

(57) ABSTRACT

There is described an accelerometer which is fabricated utilizing a beam diaphragm sensor employing dielectrically isolated resonant beams. Each resonant beam is subject to an acceleration. One beam is an acceleration sensing beam and contains a mass which is coupled to the deflecting diaphragm. As the accelerometer is subjected to acceleration, the acceleration sensing beam will alter its resonant frequency according to the applied acceleration, while the other beam is immune to acceleration and therefore, provides a relatively fixed resonant frequency. One then takes the difference frequency between the two beams to obtain an output frequency signal which is relatively independent of temperature and/or biasing changes.

11 Claims, 1 Drawing Sheet

DUAL BEAM FREQUENCY-OUTPUT ACCELEROMETER

FIELD OF INVENTION

This invention relates to accelerometers, and more particularly, to an accelerometer which produces a frequency signal as an output.

BACKGROUND OF THE INVENTION

Conventional accelerometers produce relatively low-level analog signals. In these accelerometers, in order to obtain a digital signal, some kind of conversion to a frequency is required, which results in a loss of precision. For example, the output of the accelerometer is a voltage, which voltage has to be converted into a digital signal. This is implemented through an analog to digital converter. An analog-to-digital converter can be of many types, but the resolution of such a device is limited.

If one can produce an accelerometer which has an actual frequency signal as an output, one can convert that signal directly into a digital signal, as is well-known. Essentially, this invention describes an accelerometer, which directly produces a frequency output proportional to the input acceleration.

SUMMARY OF INVENTION

There is described an accelerometer which is fabricated utilizing a beam diaphragm sensor employing dielectrically isolated resonant beams. Each resonant beam is subject to an acceleration. One beam is an acceleration sensing beam and contains a mass which is coupled to the deflecting diaphragm. As the accelerometer is subjected to acceleration, the acceleration sensing beam will alter its resonant frequency according to the applied acceleration, while the other beam is immune to acceleration and therefore, provides a relatively fixed resonant frequency. One then takes the difference frequency between the two beams to obtain an output frequency signal which is relatively independent of temperature and/or biasing changes and indicative of the applied acceleration.

DETAILED DESCRIPTION OF THE FIGURES

Figure 1:
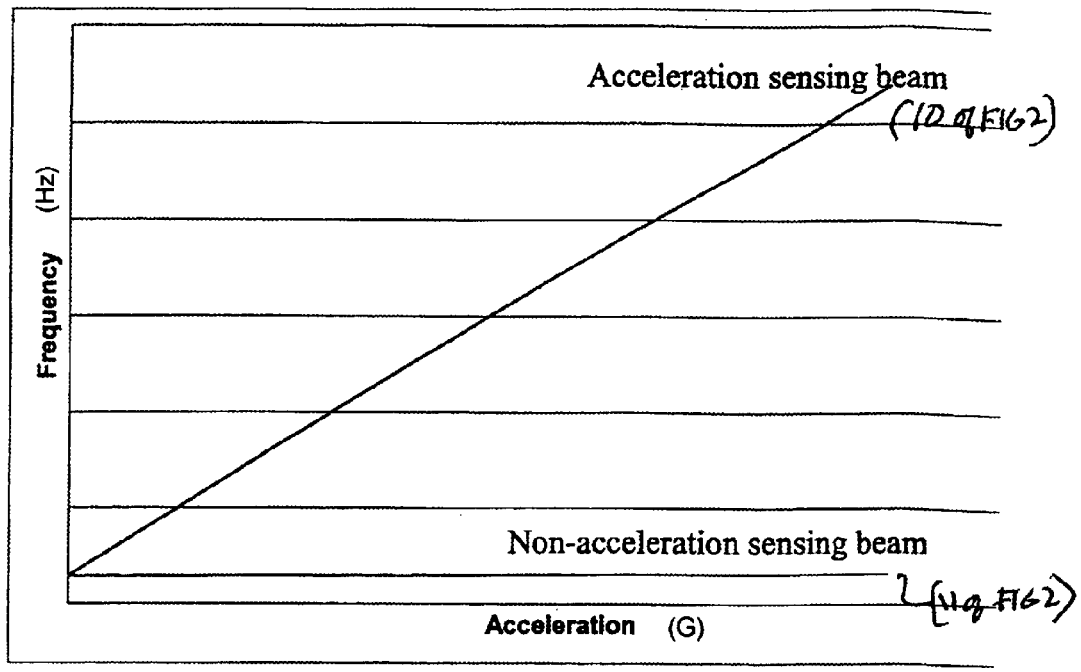
FIG. 1 is a graph depicting the response of an accelerating sensing beam and a non-accelerating sensing beam in regard to acceleration and output frequency, according to this invention.

Before proceeding with a description of the invention, reference is made to U.S. Pat. No. 5,473,944 entitled, "Beam Pressure Sensor Employing Dielectrically Isolated Resonant Beams and Related Methods of Manufacture", which issued on Dec. 12, 1995 to A. D. Kurtz et al., one of the inventors herein and assigned to Kulite Semiconductor Products, Inc., the assignee herein. The entire application is incorporated herein by reference.

In that particular patent there is shown two resonating beams, which are utilized and which are each affected by an externally applied stress to a different extent. For example, one resonating beam may be totally unaffected by applied pressure, while the other beam's natural frequency will depend on applied pressure. If the two resonant frequencies are inputted into suitable electronics, the difference frequency between the two beams may be obtained. In this way, since each beam's resonant frequency will change slightly with respect to temperature, this difference cancels out.

Moreover, by measuring the difference frequency, greater inherent accuracy will result. For example, as shown, one can resolve the frequency to one part in $10^5$. Each natural frequency is on the order of 100 kHz. In this manner, the difference frequency is 10 kHz and accuracy enhancements of a factor of ten will result. In the above-noted '944 patent, as cited, there are many other advantages from the structure shown therein. For instance, if it is desired to measure an absolute pressure, it is sufficient to ensure that the backsides of each resonating beam structure is exposed to vacuum and only one of the resonating beams is connected to a deflecting diaphragm. This way, the application of an absolute pressure to the front side of the structure will then result in the change of frequency of the stress coupled beam. Thus, the difference frequency will be a direct measure of absolute pressure. As seen in the '944 patent, there is described methods of fabricating such beams, as well as the dual beam structure.

In reviewing the above-noted patent, it should become apparent that there is described the use of two resonating beams, which reduces and substantially eliminates all of the thermal effects between the two beams, since each beam changes in the same way and is a function of temperature. Moreover, the use of two beams in a differential condition enables the measurement of gage pressure by subtracting the resonant frequency of the applied gage pressure beam from that of the other beam. As also seen, additional benefit comes from the specific method of manufacturing, which is by the use of dielectrically isolated diffusion enhanced fusion bonding, which yields a device that can operate at significantly higher temperatures than prior art devices.

Thus, as will be explained, the present invention utilizes two vibrating beams. Each beam is located on a compliant diaphragm. A mass is attached to only one of the diaphragms. The appropriate excitation circuitry is applied to each beam in order to excite the beam at their respective resonant frequencies. It is well-known in the art on how to accomplish this. For example, one can apply a frequency signal to the beam via the contacts on the beam. This frequency signal will cause the beam to resonate only at its resonant frequency. The resonant frequency is fixed, as a function of beam size and so on. As one can see from the above-noted '944 patent, the use of resonant beams, as well as techniques for exciting such beams are well-known.

As the sensor undergoes acceleration in a direction perpendicular to the diaphragm surface, the diaphragm that has an attached mass causes that diaphragm to deflect, while the deflection of the other diaphragm is negligible. The deflection of the diaphragm causes tension in the beam which alters the beam's resonant frequency. As the beams are vibrating at their respective resonant frequencies, one of any number of methods can be used to sense the deflection of the beams via the piezoresistors placed on the beams or by other capacitive methods. The two resonant frequencies are then inputted to the appropriate electronics to determine the difference or beat frequency. The beat frequency is proportional to the acceleration applied to the sensor. External variables, such as temperature, may cause small variations in the output frequencies of the beam. However, because the beams are identical in all respects, except for the acceleration-sensing mass attached to one diaphragm, any such variations would be equal in both beams and therefore, cancel out when the difference or beat frequency is obtained.

As one will understand, the fabrication procedure for such an accelerometer is the same as that for the dual beam pressure sensor described in U.S. Pat. No. 5,473,944. The operation of the two sensors is also similar in principle. In the case of the pressure sensor, an applied pressure deflects the diaphragm to create a tension in the beam. In the case of the accelerometer, the mass provides the equivalent force on the diaphragm. In order to determine the amount of mass required, it is instructive to compare the force applied to the diaphragm in each case. For a pressure sensor, the total force on the diaphragm is given simply by F=P×A, where P is the pressure and A is area of the diaphragm. In the present case of the accelerometer, F=ma, where m is the mass attached to the diaphragm and $\alpha$ is the acceleration. Thus, the mass required for an accelerometer whose full-scale acceleration is a to be equivalent to a pressure sensor with a full-scale pressure of P is m=P×A/a. The mass spans the entire area of the diaphragm, the area cancels out and the thickness of the mass is t=P/a $\rho$, where $\rho$ is the mass-density of the weight.

It has been shown by finite-element analysis that the output frequency of the acceleration sensing beam increases linearly to applied acceleration, while the output of the non-acceleration-sensing beam does not change significantly under applied acceleration. A typical resonant-frequency for a silicon beam is in the hundreds of kHz. When using a high-density material such as tungsten for the mass, it results in a frequency shift of approximately 20% of an acceleration of 100 G. Results from a typical finite-element analysis are shown in FIG. 1. The cross-sectional view of the accelerometer is depicted in FIG. 2.

Figure 2:
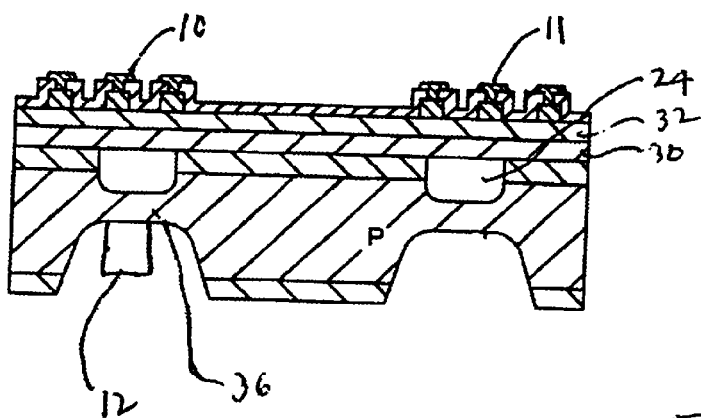
FIG. 2 is a cross sectional view of a dual beam resonant accelerometer, according to this invention.
Figure 1:
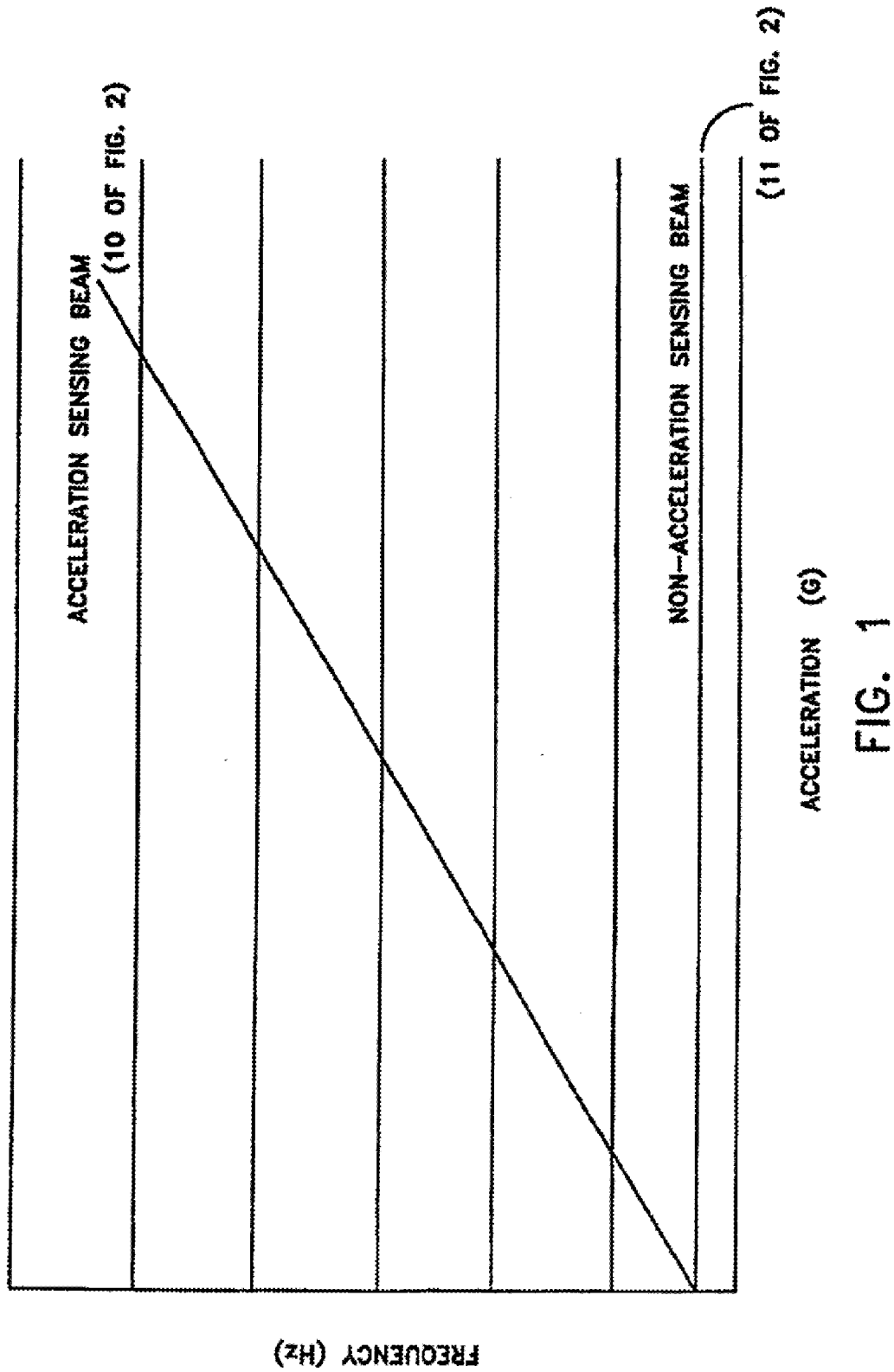
Figure 2:
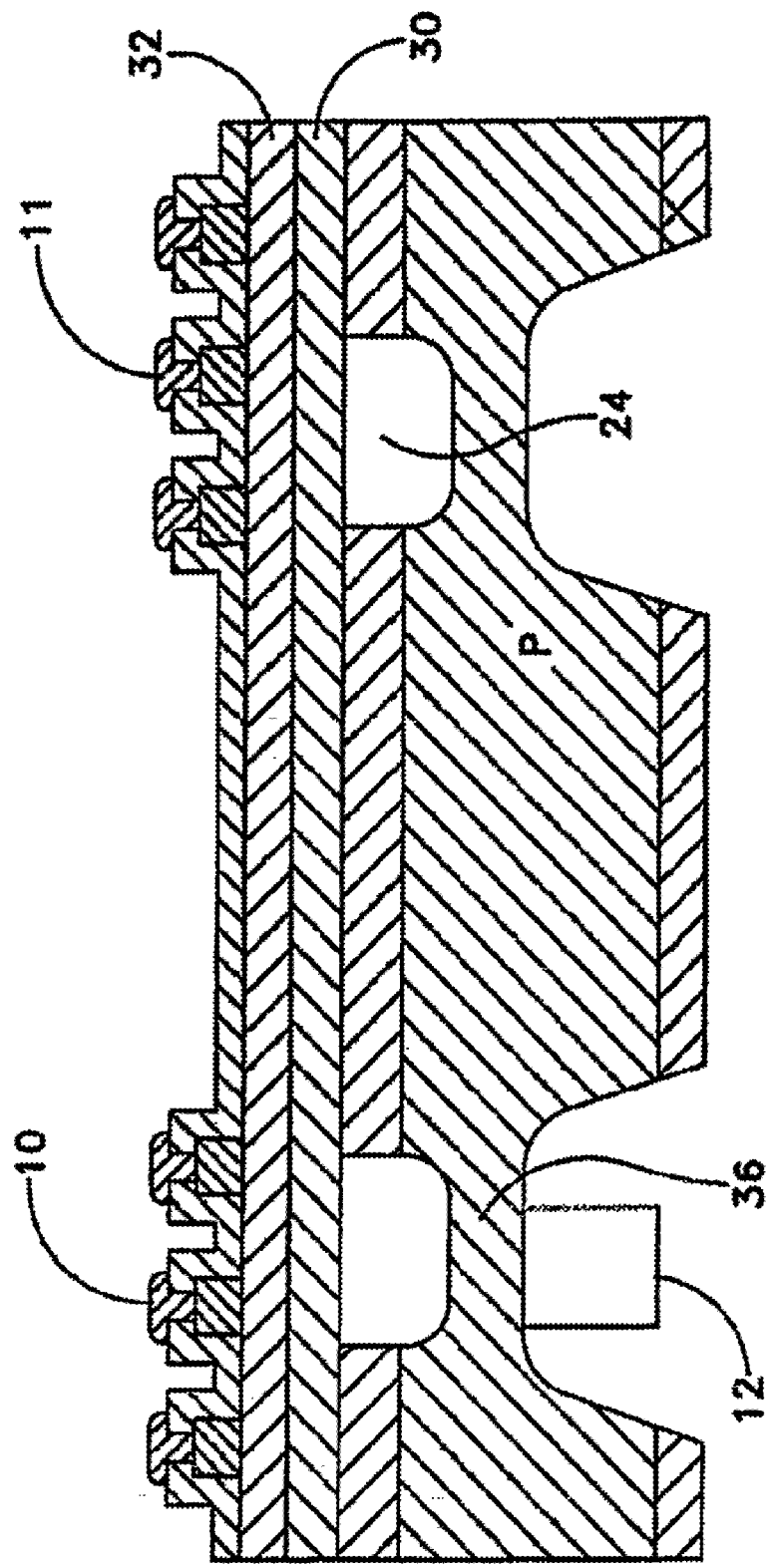

Referring to FIGS. 1 and 2, a brief description of the operation will be provided. As clearly indicated above, the resonant sensor configuration comprises two resonant beam sensors shown in FIG. 2 as 10 and 11. If reference is made to U.S. Pat. No. 5,473,944 entitled, "Beam Pressure Sensor Employing Dielectrically Isolated Resonant Beams and Related Methods of Manufacture", one can ascertain that FIG. 2 is depicted in the above-noted patent as FIG. 15. In all matters, the structure of FIG. 2 is identical with the structures depicted in the above-noted patent, which patent is incorporated herein in its entirety.

As one can ascertain, the only difference between the sensor shown in FIG. 2 and the sensor shown in FIG. 15 of the '944 patent is the addition of a weight or mass 12. The mass 12 is preferably tungsten, but another high density material of metal can be used. The weight 12 is secured to the deflecting diagram 36 of beam 10. It can be secured by a suitable adhesive, glue or epoxy or by other means. As indicated, the mass 12 will be subjected to acceleration. Both sensors 10 and 11 are beam sensors, which operate at resonant frequencies. As seen in FIG. 1, when the sensor configuration is introduced to acceleration, the acceleration sensor beam, which is 10 of FIG. 2, will provide a frequency which is directly proportional to the acceleration. The non-acceleration sensing beam, which is beam 11, will just produce its resonant frequency. Therefore, one can subtract the resonant frequency of beam 11 from the resonant frequency of the accelerating sensing beam 10 and obtain an output frequency indicative of acceleration. This output frequency can then be converted to a digital signal by an analog-to-digital converter or by a typical memory look up table. As one can ascertain from FIG. 1, the response of the accelerating sensing beam, having the mass 12 imposed thereon, is linear with acceleration and produces frequencies which are also linear with acceleration. One can use the output of the sensing beam 10 directly or one can subtract the output of the acceleration sensing beam with the output of the non-acceleration sensing beam to obtain a difference frequency and utilize the difference frequency which is proportional to acceleration.

It should be clear to those skilled in the art that there are many techniques of subtracting frequencies by the use of mixers and other conventional circuit devices. One can also ascertain that one can measure the frequency from the acceleration beam and therefore, enter a memory which has stored acceleration versus frequency and therefore, one can utilize the memory and look up the acceleration once the output frequency of the sensing beam is known.

It is, of course, important that the device shown in FIG. 2 be manufactured according to the teachings of the '944 patent. As is clear from that patent, the piezoresistor network of each of the beams is masked and the resonant beams 10 and 11 are formed by defining two parallel slots in oxide layer 32 and p+ type layer 30, just above each shallow depression 24, it is formed using conventional etching techniques.

The complete formation of the device is clearly described in regard to the '944 patent. Typically, a voltage is applied between the beams and the diaphragm, which causes each of the beams 10 and 11 to vibrate at a resonant frequency which initially is indicative of no applied pressure. This is made possible by fabricating contacts between the beams and the diaphragm. The contacts are described in the '944 patent, but one deposits metallization between the beams and diaphragm. As one can see, when an acceleration is applied to the device, the mass 12 causes the acceleration sensing beam 10 to change frequency. The beam 11 does not change frequency because of the fact there is no mass associated within and the beam is relatively isolated from the accelerating force. In this manner, the accelerating sensing beam 10, as shown in FIG. 1, will produce the frequency output, while the frequency of the non-accelerating sensing beam 11 is fixed. One should take the difference frequency because of the fact that differences in frequency, which are due to changes and so on, affect both gages. Therefore, as in the '944 patent, the measurement of gage pressure in the prior art, as described in the '944 patent, is unaffected by changes in the operational temperature of the transducer, since both beams are affected equally by the changes in the operational temperature of the transducer.

This is absolutely true of the accelerometer, as described above. Both beams 10 and 11 are similarly affected by temperature and therefore, when the output of beam 11 is subtracted from the output of acceleration sensing beam 10, one has a frequency output which is totally independent of temperature or supplied voltage changes.

It should be understood that the embodiments described herein are exemplary and many alternate embodiments of additional embodiments will become apparent to those skilled in the art. Such alternate embodiments are to be construed as being within the spirit of the present invention, as limited by the claims appended hereto.

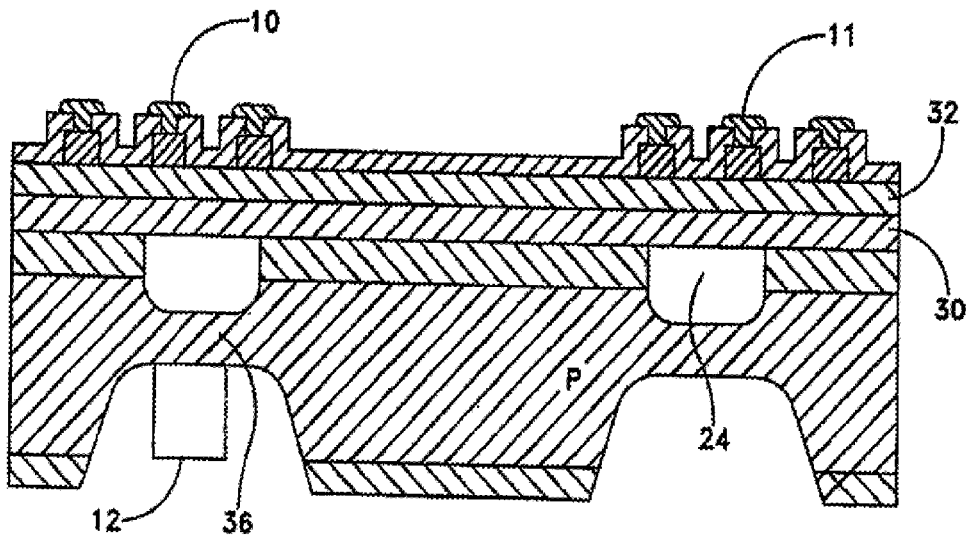

What is claimed is:

1. An accelerometer comprising:

a beam diaphragm sensor employing at least first and second dielectrically isolated resonant beams, each beam positioned on a common substrate and each beam formed by a same fabrication process, each beam having an associated diaphragm capable of deflecting when subjected to a force, a mass coupled to only the diaphragm associated with said first resonant beam to enable said first beam to alter a resonant frequency according to an applied acceleration with said second resonant beam relatively unaffected by said applied acceleration.

2. The accelerometer according to claim 1 wherein each beam includes a plurality of piezoresistors capable of charging resistance according to an applied force.

3. The accelerometer according to claim 1 wherein a resonant frequency of said second beam is subtracted from the altered resonant frequency of said first beam to obtain a difference frequency indicative of acceleration.

4. The accelerometer according to claim 1 wherein said mass is fabricated from a high density material.

5. The accelerometer according to claim 4 wherein said high density material is metal.

6. The accelerometer according to claim 5 wherein said metal is tungsten.

7. The accelerometer according to claim 1 wherein said acceleration is applied relatively perpendicular to the diaphragm.

8. The accelerometer according to claim 1 wherein said beam diaphragm sensor is fabricated from silicon.

9. The accelerometer according to claim 1 wherein said substrate is p-type silicon.

10. The accelerometer according to claim 1 where said fabrication process includes diffusion-aided fusion bonding.

11. An accelerometer comprising: a beam diaphragm sensor having only first and second dielectrically isolated resonant beams each having an associated diaphragm capable of deflecting when subjected to a force; wherein, said diaphragm associated with said first resonant beam is mass loaded to alter a resonant frequency thereof according to an applied acceleration and a resonant frequency of said second resonant beam is relatively unaffected by said applied acceleration.

* * * * *

UNITED STATES PATENT AND TRADEMARK OFFICE
CERTIFICATE OF CORRECTION

| | |
|---|---|
| PATENT NO. | : 6,848,307 B1 |
| APPLICATION NO. | : 10/685145 |
| DATED | : February 1, 2005 |
| INVENTOR(S) | : Kurtz et al. |

It is certified that error appears in the above-identified patent and that said Letters Patent is hereby corrected as shown below:

The title page showing the print figure should be deleted, and replaced with the attached amended title page.
Drawing sheet, consisting of Fig. 1 and 2, should be deleted and replaced with the drawing sheets, consisting of Fig. 1 and 2, as shown on the attached pages.

Signed and Sealed this

Twenty-eighth Day of November, 2006

JON W. DUDAS
*Director of the United States Patent and Trademark Office*

(12) United States Patent
Kurtz et al.

(10) Patent No.: US 6,848,307 B1
(45) Date of Patent: Feb. 1, 2005

(54) DUAL BEAM FREQUENCY-OUTPUT ACCELEROMETER

(75) Inventors: Anthony D. Kurtz, Ridgewood, NJ (US); Boaz Kochman, New York, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/685,145

(22) Filed: Oct. 14, 2003

(51) Int. Cl.$^7$ .................................. G01P 15/08
(52) U.S. Cl. ................................... 73/514.29
(58) Field of Search ...................... 73/514.29, 862.59, 73/514, 15, 514.16, 514.36, 514.18, 514.33

(56) References Cited

U.S. PATENT DOCUMENTS

| | | | | |
|---|---|---|---|---|
| 4,479,385 A | * | 10/1984 | Koehler | 73/514.29 |
| 4,628,735 A | * | 12/1986 | Kirkpatrick | 73/514.29 |
| 4,724,351 A | * | 2/1988 | EerNisse et al. | 310/328 |
| 5,020,370 A | * | 6/1991 | Deval et al. | 73/514.29 |
| 5,036,715 A | * | 8/1991 | Hanson | 73/862.59 |
| 5,089,695 A | * | 2/1992 | Willson et al. | 250/227.21 |
| 5,113,698 A | * | 5/1992 | Grlj et al. | 73/862.59 |
| 5,473,944 A | | 12/1995 | Kurtz et al. | 73/704 |
| 5,574,220 A | * | 11/1996 | Amand et al. | 73/514.29 |

* cited by examiner

*Primary Examiner*—Helen Kwok
(74) *Attorney, Agent, or Firm*—Plevy, Howard & Darcy, P.C.

(57) ABSTRACT

There is described an accelerometer which is fabricated utilizing a beam diaphragm sensor employing dielectrically isolated resonant beams. Each resonant beam is subject to an acceleration. One beam is an acceleration sensing beam and contains a mass which is coupled to the deflecting diaphragm. As the accelerometer is subjected to acceleration, the acceleration sensing beam will alter its resonant frequency according to the applied acceleration, while the other beam is immune to acceleration and therefore, provides a relatively fixed resonant frequency. One then takes the difference frequency between the two beams to obtain an output frequency signal which is relatively independent of temperature and/or biasing changes.

11 Claims, 1 Drawing Sheet